L. V. Badger,
Cage Trap,

No. 66,550. Patented July 9, 1867.

Witnesses:
Thos Tusche
Wm Trewin

Inventor:
L. V. Badger
Per Munn & Co
Attorneys

UNITED STATES PATENT OFFICE.

L. V. BADGER, OF CHICAGO, ILLINOIS.

*Letters Patent No. 66,550, dated July 9, 1867.*

IMPROVEMENT IN ANIMAL-TRAPS.

*The Schedule referred to in these Letters Patent and making part of the same.*

TO ALL WHOM IT MAY CONCERN:

Be it known that I, L. V. BADGER, of Chicago, Cook county, Illinois, have invented a new and improved Animal Trap; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to furnish an improved rat-trap, simple in construction, not liable to get out of order, and reliable in operation, and one which the rat, by escaping into the cage, will again set; and it consists in the combination of the connecting-rods and slide (having a trigger formed upon or attached to its lower end) with each other and with the pivoted doors and side of the box or frame of the trap, the whole being constructed and arranged as hereinafter more fully described.

Figure 1:
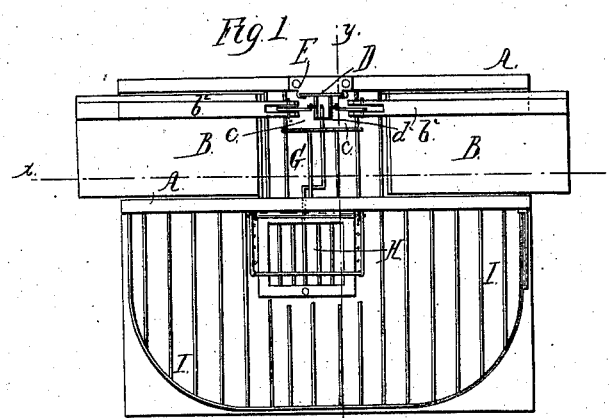
Figure 1 is a top or plan view of my improved trap.
Figure 2:
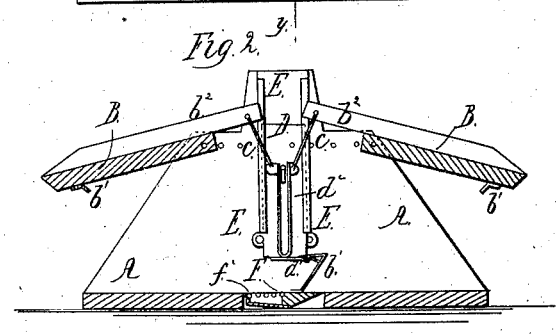
Figure 2 is a vertical section of the same taken through the line $x\,x$, fig. 1.
Figure 3:
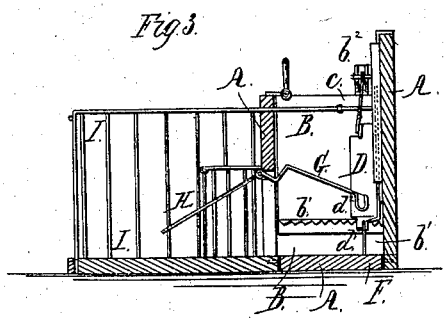
Figure 3 is a vertical section of the same taken through the line $y\,y$, fig. 2.

A is the box of the trap, which may be made of any desired or convenient size, according to the size of the animal trapped for. For catching rats, I prefer to make it about eighteen inches long and five inches wide. B are the doors that close the ends of the box, and which are pivoted at their upper edges to the sides of said box, as shown in fig 2. $b^1$ are serrated flanges attached to the inner sides of the doors B, near their lower ends, to prevent the rats from raising the said doors and escaping from the trap. $b^2$ are arms attached to the doors B, and projecting upward, as shown in fig. 2. To the upper ends of the arms $b^2$ are pivoted the upper ends of the connecting-rods C, the lower ends of which are pivoted to the slide D. The rods C are so arranged in connection with the doors B and slide D, that when the said doors are down, they cannot be raised without first lowering the slide D. The slide D works up and down in a groove, E, formed in or attached to the side of the box A, and has a trigger $d^1$ formed upon or attached to its lower end, as shown in figs. 2 and 3, upon which the catch $f^1$, attached to the pivoted platform F, takes hold, to hold the slide D down and the doors raised, as shown in fig. 2. The platform F is pivoted in the bottom of the trap, so that its upper surface may be level with the upper surface of said bottom. In one side of the platform F is formed a chamber, $f^2$, in which the bait is placed, and which is covered with wire gauze so that the rats cannot come in contact with said bait to eat or defile it. To the upper side of the pivoted platform F is attached a catch, $f^1$, that takes hold of the trigger $d^1$ to set the trap. Upon the forward side of the slide D is formed a deep groove, $d^2$, the lower end of which is closed, as shown in fig. 2, into which enters the end of the lever-spring G, the other end of which is attached to the swinging door H that closes the opening between the box A and the cage I. When the door H is raised, by the rat seeking to escape from the trap, the projecting end of the spring-lever G is forced down upon the closed end of the groove $d^2$, which, forcing down the slide D, and raising the doors B, sets the trap.

Having thus described my invention, I claim as new, and desire to secure by Letters Patent—

1. The combination of the connecting-rods C and slide D, having a trigger $d^1$ formed upon or attached to its lower end, with each other, and with the pivoted doors B and side of the box A, substantially as herein shown and described, and for the purpose set forth.

2. Forming a bait-chamber in the pivoted platform F, substantially as herein shown and described, and for the purpose set forth.

The above specification of my invention signed by me this 31st day of January, 1867.

L. V. BADGER.

Witnesses:
E. S. CUTTS,
WM. C. STORY.